United States Patent Office 3,005,775
Patented Oct. 24, 1961

3,005,775
SYNTHETIC LUBRICANTS
Samuel Richard Pethrick and Maurice Barrington Sparke, Sunbury-on-Thames, England, assignors to The British Petroleum Company Limited, London, England, a British joint-stock corporation
No Drawing. Filed Apr. 20, 1959, Ser. No. 807,323
Claims priority, application Great Britain May 1, 1958
17 Claims. (Cl. 252—57)

This invention relates to synthetic lubricants, particularly synthetic lubricants suitable for use in aero gas turbines.

Synthetic lubricants have previously been proposed consisting of a blend of a liquid aliphatic diester of a saturated aliphatic dicarboxylic acid, and a polyester of the general formula $$HO(R_2OOCR_1COO)_nR_2OH \qquad I$$

where $R_1$ is the hydrocarbon radical of an aliphatic dicarboxylic acid, $R_2$ is the hydrocarbon radical of a glycol and $n$ is a number from 1 to 10 (see U.K. patent specification No. 763,077).

We have now found that certain blends of the above type or similar to the above type can be produced that have properties which render them particularly suitable for aero gas turbine lubrication.

According to the invention, a lubricating composition comprises a blend of a liquid aliphatic diester of a saturated aliphatic dicarboxylic acid, and a polyester, soluble in the diester, and having the general Formula I (above), where:

$n$ is an integer,
the $R_1$'s are alkylene groups having 4–14, preferably 6–10, carbon atoms, and the $R_2$'s are hydrocarbon groups of the formula

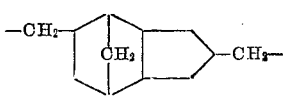 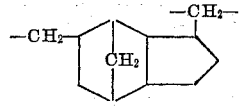

or

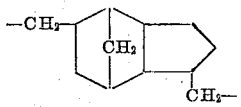

the relative proportions of diester and polyester in the blend being such that the viscosity of the blend at 210° F. is 4–30, preferably 4–10, especially 6–10, centistokes.

Preferred diesters for use in blends according to the invention are those of the formula:

$$R_4OOCR_5COOR_4$$

where $R_5$ is an alkylene group having 4–14 carbon atoms and the $R_4$'s are alkyl groups, preferably branched-chain, having 4–18 carbon atoms.

Examples of suitable diesters are:

(i) Di(2-ethylhexyl) sebacate; (di-octyl sebacate).
(ii) Di(3:5:5-trimethylhexyl) sebacate; (di-nonyl sebacate).
(iii) 2-ethylhexyl (3:5:5-trimethylhexyl) sebacate; (octyl nonylsebacate).
(iv) Mixtures of (i), (ii) and (iii).

Preferred polyesters are those of Formula I having a viscosity at 25° C. of at least 50, preferably at least 500, centistokes, particularly those in which the $R_1$'s have 7 or 8 carbon atoms, especially octamethylene, 1:1:3-trimethyltetramethylene or 1:3:3-trimethyltetramethylene.

It is to be understood that different $R_1$ and $R_2$ groups may be present in any given polyester molecule, that different $R_4$ groups may be present in any given diester molecule and that mixtures of different polyester molecules and/or different diester molecules may be present in the same blend.

Polyesters for use in the lubricant blend according to the invention may be prepared by reacting in one or more stages, the following ingredients:

(a) an acid or acids of the formula $HOOCR_1COOH$ (where $R_1$ has the value given previously), and
(b) one or more of the three isomeric tricyclodecanedimethylols the molecular proportion of diol(s) being greater than, but preferably not more than twice, the molecular proportion of acid(s). As stated above, mixtures of polyesters of Formula I may be used in the lubricant blend i.e. polyesters having different values of $n$ and having different acid and diol residues. With such a mixture, the average value of $n$ would not necessarily of course be a whole number. Thus when preparing a polyester mixture, the molecular proportions of the ingredients to be reacted need not be present in whole number ratios.

Examples of acids which may be used in the preparation of the polyester are adipic acid, pimelic acid, suberic acid, azelaic acid, sebacic acid and brassylic acid.

One particularly satisfactory mixture of acids has been found to be an equimolecular mixture of 2:2:4-trimethyladipic acid, 2:4:4-trimethyladipic acid and sebacic acid.

Preferably the blend according to the invention is one containing 5–60% by weight of polyester, especially 5–35%, the remainder of the blend being substantially diester.

Any antioxidant for lubricants, for example phenothiazine, may be incorporated in the blend if desired.

By way of example, a polyester (P161) was prepared from the following ingredients:

| | Molecular proportions |
|---|---|
| Sebacic acid | 0.33 |
| 2:2:4-trimethyladipic acid | 0.33 |
| 2:4:4-trimethyladipic acid | 0.33 |
| Commercial tricyclodecanedimethylol | 1.1 |

Commercial tricyclodecanedimethylol is believed to be a mixture of the three isomers:

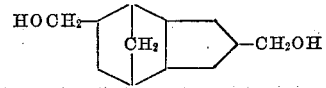

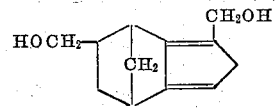

and

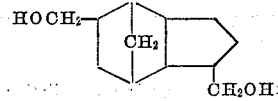

The polyester was prepared as follows:

The ingredients were reacted in a three-necked flask fitted with a stirrer, a nitrogen inlet tube and a water-cooled, downward facing condenser fitted with a Dean and Stark water trap. The water was removed from the trap at such a rate that the diol/water interface remained static at the top of the trap thus ensuring that the diol in the distillate was automatically returned to the reaction vessel. A nitrogen flow rate of 6 litres/hour was used and the following heating cycle was carried out:

Heat to 200° C. over 8 hours.
Maintain at 200° C. for 40 hours.
Maintain at 200° C. at 1 mm. of mercury pressure until an acid value of 3 mg. KOH/g. was obtained.

The polyester did not flow at 25° C.

Polyester P161 was blended with a diester and phenothiazine to form blend B161 having the compositions and properties shown in the table below.

By way of comparison, certain properties are also given of a commercially available synthetic aero gas turbine lubricant (X) and a blend (B61) containing a diester a known polyester of Formula I (P61) which consists of a poly-propylene sebacate) available commercially under the trade name "Reoplex 100" and phenothiazine.

It will be seen that the blend according to the invention (B161) has greatly improved thermal stability compared with blend B61 which incorporates polyester P61. (Thermal stability is indicated by a low change in viscosity after the high temperature treatment.) Furthermore, blend B161 shows excellent low temperature properties whereas blend B61 gives a poor performance at low temperatures despite the fact that it contains a higher proportion of the less viscous diester component than blend B161. Blend X also gave a poor low temperature performance.

The low temperature properties of blends according to the invention may be further improved if desired by the addition of a crystallisation suppressant, e.g. a polymerised alkyl ester of acrylic or methacrylic acid, but it is an advantage when good low temperature properties can be achieved without the addition of such materials since they appear to have an adverse effect on both the thermal stability and shear stability of blends containing them.

The open beaker test referred to in the table was carried out as follows. 250 ml. of oil were heated in a 400 ml. beaker in an oven maintained at an air temperature of 300° C. Samples of the oil were withdrawn after heating for 2, 3, 4 and 5 hours and the viscosity at 100° F. measured.

The diester used in blends B161 and B61 was prepared from equimolecular amounts of sebacic acid, 2-ethylhexanol and 3:5:5-trimethylhexanol. In addition to octylnonyl sebacate, the product also contained di-octyl and di-nonyl sebacate.

$R_2$ is at least one hydrocarbon radical selected from the group consisting of radicals of the formula

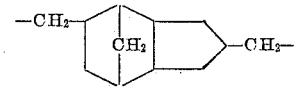

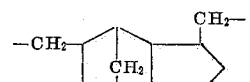

and

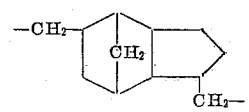

the viscosity of the polyester at 25° C. being at least 50 centistokes, and the relative proportions of diester and polyester in the blend being such that the viscosity of the blend at 210° F. is 4-10 centistokes.

2. A lubricating composition according to claim 1, in which the relative proportions of diester and polyester in the blend are such that the viscosity of the blend at 210° F. is 6-10 centistokes.

3. A lubricating composition according to claim 1, in which the blend contains 5 to 35% by weight of the polyester.

4. A lubricating composition according to claim 1, in which $R_4$ is a branched-chain alkyl group.

5. A lubricating composition according to claim 1, in which the diester is di(2-ethylhexyl) sebacate.

6. A lubricating composition according to claim 1, in which the diester is di(3:5:5-trimethylhexyl) sebacate.

7. A lubricating composition according to claim 1, in which the diester is 2-ethylhexyl(3:5:5-trimethylhexyl) sebacate.

8. A lubricating composition according to claim 1, in which the diester is a mixture of di(2-ethylhexyl) sebacate, di(3:5:5-trimethylhexyl) sebacate and 2-ethylhexyl (3:5:5-trimethylhexyl) sebacate.

Table

| Blend | Ingredients of blends, percent wt. | | | Viscosity at 210 F. | Viscosity at 100 F. | Low Temperature Performance | | Thermal Stability (Open Beaker Test) Maximum Change in viscosity at 100 F., percent |
|---|---|---|---|---|---|---|---|---|
| | Diester | Polyester | Anti-Oxidant | | | Viscosity at −40 F. | Supercooling Test | |
| B161 | 88.78 | 10.22 (P161) | 1.0 | CS. 7.84 | CS. 38.78 | 11,400 cs. after 12 hours at −65° F. | Clear and mobile after 162 hours at −70° C. | −7.0 |
| B61 | 91.46 | 7.54 (P61) | 1.0 | 6.50 | 28.36 | Immobile | | −20.2 |
| X | | | | 7.51 | | Immobile | | |

CS.=centistokes.

We claim:

1. A lubricating composition condisting essentially of a blend of: a liquid aliphatic diester of the formula $R_4OOCR_5COOR_4$ where $R_5$ is an alkylene group having 4-14 carbon atoms and $R_4$ is an alkyl group having 4-18 carbon atoms, and 5-60% by weight of the composition of a polyester which is soluble in the diester and has the general formula $$HO(R_2OOCR_1COO)_nR_2OH$$

where:

$n$ is an integer, $R_1$ is an alkylene group having 6-10 carbon atoms, and

9. A lubricating composition according to claim 1, in which the polyester is one in which $R_1$ is an alkylene group having 7-8 carbon atoms.

10. A lubricating composition according to claim 1, in which the polyester has a viscosity at 25° C. of at least 500 centistokes.

11. A lubricating composition according to claim 1, containing, in addition, an antioxidant for lubricants, in an antioxidizing amount.

12. A lubricating composition according to claim 10, in which the polyester is one in which $R_1$ is selected from the group consisting of the following radicals:

octamethylene,
1:1:3-trimethyltetramethylene, and
1:3:3-trimethyltetramethylene.

13. A lubricating composition according to claim 11, in which the antioxidant is phenothiazine.

14. A lubricating composition according to claim 13, in which the content of phenothiazine is about 1% by weight of the composition.

15. A lubricating composition consisting essentially of a blend of a liquid aliphatic diester of the formula $R_4OOCR_5COOR_4$, where $R_5$ is an alkylene group having 4–14 carbon atoms and $R_4$ is an alkyl group having 4–18 carbon atoms, and 5–60% by weight of the composition of a polyester which is soluble in the diester and which has been prepared by reacting a tricyclodecanedimethylol selected from the group consisting of

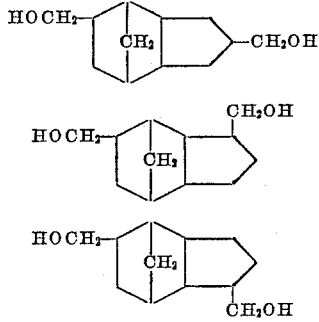

and mixtures thereof, with an acid of the formula $$HOOCR_1COOH$$

where $R_1$ is an alkylene group having 6–10 carbon atoms, the molecular proportion of said tricyclodecanedimethylol being greater than, but not more than twice, the molecular proportion of acid, the viscosity of the polyester at 25° C. being at least 50 centistokes, and the relative proportions of diester and polyester in the blend being such that the viscosity of the blend at 210° F. is 4–10 centistokes.

16. A lubricating composition according to claim 15, in which the acid is an equimolecular mixture of 2:2:4-trimethyladipic acid, 2:4:4-trimethyladipic acid and sebacic acid.

17. A lubricating composition according to claim 16, in which the tricyclodecanedimethylol is a mixture of three isomers having the formulas:

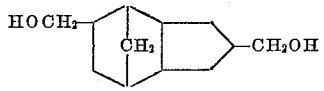

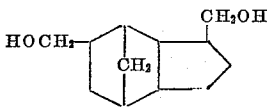

and

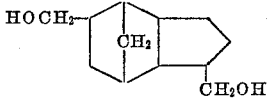

References Cited in the file of this patent
UNITED STATES PATENTS 2,817,673  Roelen et al. ----------- Dec. 24, 1957

FOREIGN PATENTS 763,077  Great Britain ----------- Dec. 5, 1956

OTHER REFERENCES

"Synthetic Lubricants," by W. E. McTurk, Wright Air Development Center Technical Report 53–88, October 1953, pages 15–22.